Feb. 3, 1970
JAMES E. WEBB
ADMINISTRATOR OF THE NATIONAL
AERONAUTICS AND SPACE
ADMINISTRATION
3,493,437
SOLAR CELL SUBMODULE
Filed April 20, 1966
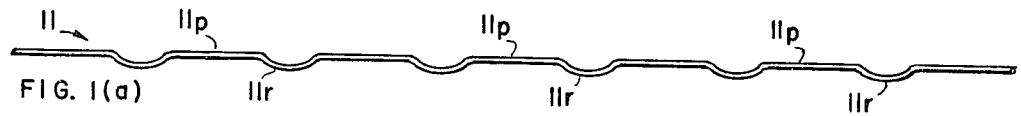
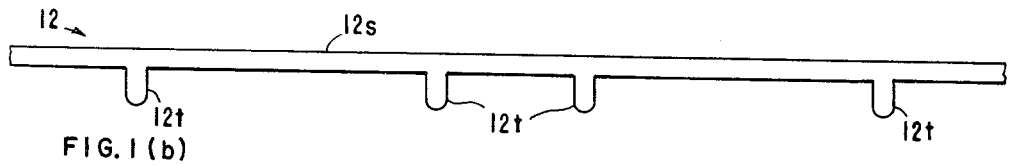
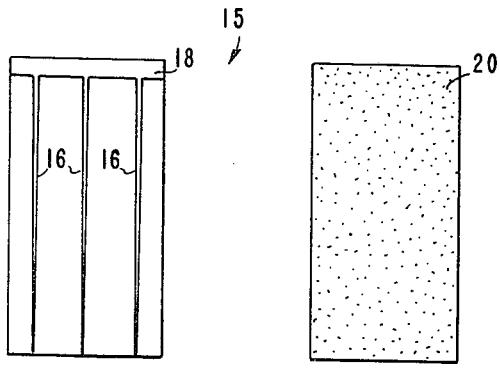
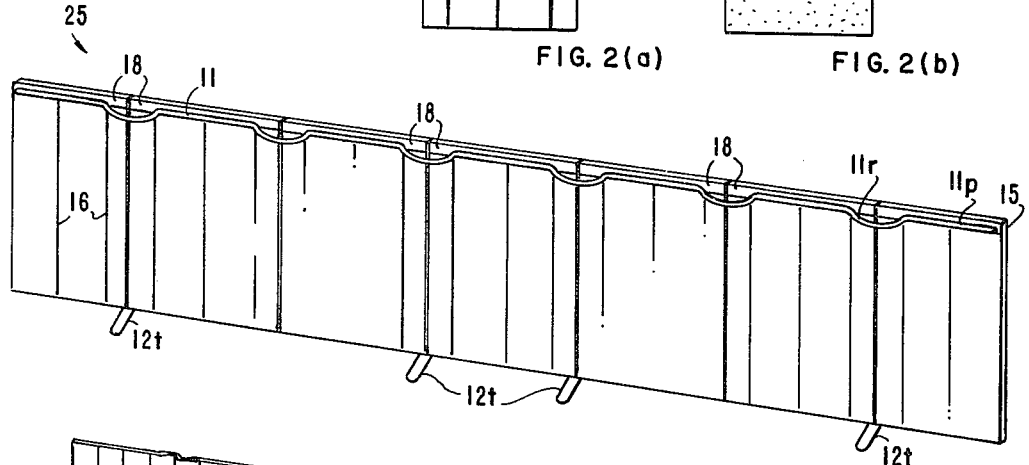
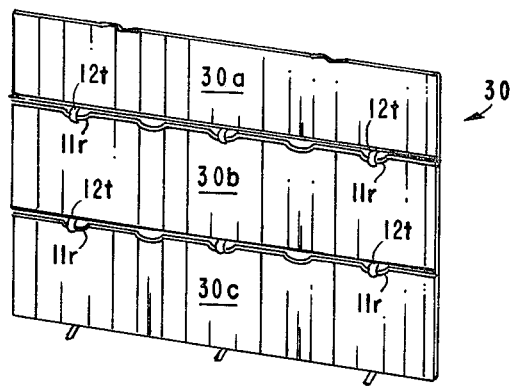
INVENTOR.
ROBERT K. YASUI
BY
ATTORNEYS 3,493,437
SOLAR CELL SUBMODULE
James E. Webb, Administrator of the National Aeronautics and Space Administration, with respect to an invention of Robert K. Yasui, Los Angeles, Calif.
Filed Apr. 20, 1966, Ser. No. 545,223
Int. Cl. H01m 15/02
U.S. Cl. 136—89                               7 Claims

ABSTRACT OF THE DISCLOSURE

A multicell submodule is provided, in which a first busbar has portions thereof electrically connected to a first terminal of each of the cells in the submodule, with raised portions of the first busbar being present between the portions thereof which are in contact with the cell's first terminals. A second busbar, which is electrically connected to the second terminals of the various cells in the submodule, includes a plurality of tabs which extend from the second busbar. These tabs are adapted to be connected to the raised portions of a first busbar of another submodule in order to form a multisubmodule cell matrix.

---

The invention described herein was made in the performance of work under a NASA contract and is subject to the provisions of Section 305 of the National Aeronautics and Space Act of 1958, Public Law 85–568 (72 Stat, 435; 42 USC 2457).

This invention relates to matrix construction and more particularly to the construction of submodules and modules of cells such as solar cells.

Different energy sensitive devices are extensively used to convert energy from one form to another, such as for example solar sells used to convert light into electrical current. Since the amount of electrical energy produced by one cell is quite small, they are arranged in matrices, generally formed by arranging the cells in rows and columns. Each cell is interconnected by means of busbars running along each row and column. The cell contacts are quite delicate and therefore extreme care must be exercised when connecting it to the busbars to produce the matrix and in particular when replacing a defective cell in an already existing matrix.

When a large cell matrix or module is desired, it has been the practice to first construct cell submodules which after proper matching were combined to form the module. However, when connecting the submodules to one another such as by electrical soldering, the heat often adversely affected some of the already connected cells, resulting in a defective module.

It is accordingly an object of the invention to provide a new cell modular construction.

Another object is the provision of a simple arrangement whereby cells are combined to form submodules which are then interconnected to form an overall module without affecting any of the already connected cells.

A further object is the provision of a new busbar arrangement for connecting cells to form a cell submodule. The arrangement lends itself to interconnecting cell submodules to form a matrix by electrical soldering of the various submodules without the heat generated during the electrical soldering affecting the already connected cells in the various submodules.

These and other objects of the invention are achieved by arranging, within each submodule, cells in parallel and connecting one terminal of each cell near one end thereof with an undulative busbar having raised portions between the points of contact of the busbar with each of the cells. A second busbar which includes a plurality of protruding tabs is connected to each cell near the other end thereof with the tabs extending therefrom. Thus, after the cells forming each submodule are safely connected to the two busbars, the submodule includes the two bars as an integral part thereof.

The submodule may then be calibrated to determine its energy conversion characteristics. When the submodule is to form a part of a larger cell module, the tabs thereof are bent down over the raised portions of the undulative bar of an adjacent submodule to form a mechanical contact therebetween. The electrical contact is provided by electrical soldering. However, since the soldering is done on the raised portions of the busbar, the heat produced during the soldering is small enough not to affect the contact of the undulative busbar with the actual cell's contacts. Thus, submodules may be conveniently matched and then interconnected without the danger that during the interconnections any of the cells may be adversely affected and thereby effect the completed module.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURES 1(a) and 1(b) are side and top views respectively of the novel busbars used in the present invention;

FIGURES 2(a) and 2(b) are top and bottom views of a solar cell;

FIGURE 3 is an isometric view of a solar submodule constructed in accordance with the teachings of the invention; and FIGURE 4 is an isometric view of a solar module of the present invention.

Attention is now directed to FIGURES 1(a) and 1(b) which are side and top views of an undulative busbar 11 and a tab incorporating busbar 12, respectively. The busbars shown have been utilized in the actual reduction of the invention to practice by forming a cell submodule of commercially available cells, one of which is shown in FIGURES 2(a) and 2(b) to which reference is made herein. FIGURES 2(a) and 2(b) are top and bottom views respectively of a solar cell 15. In reducing the invention to practice, the cell was of a silicon P on N type, with thre grids 16 connected to a contact 18 formed of a P type conducting material to form the P contact of the cell. P contact 18 is along one end of the cell while the entire bottom surface of the cell is covered with an N type conducting material 20 to form the N contact of the cell.

In accordance with the teachings of the present invention, cells 15 are interconnected by means of busbars 11 and 12 [FIGURES 1(a) and 1(b)]. Undulative busbar 11 includes substantially flat contact portions 11p in between raised portions 11r. Busbar 12 on the other hand comprises a flat strip 12s having a plurality of tabs 12t extend therefrom.

Referring to FIGURE 3 there is shown an isometric view of a cell submodule 25, constructed in accordance with the teachings of the invention. The submodule comprises seven cells 15, although it is appreciated that any number of cells may be used. As seen, the cells 15 are arranged in parallel so that contacts 18 thereof are in a straight line. The undulative busbar 11 is aligned with the contacts 18, with each flat portion 11p being electrically connected, such as by soldering, to contact 18 of another cell. Busbar 11 is soldered so that portions 11r are raised from above the top of contacts 18 or the top surfaces of the cells. To the N contacts 20 of the various cells opposite the side where contacts 18 are located, is soldered the flat strip 12s of busbar 12, with the tabs 12t extending from the cells' ends. The busbar 12 is soldered so that tabs 12t are aligned with respect to the raised portions 11r of busbar 11.

The two busbars mounted in parallel across the cells placed in parallel provide common P and N terminals. Also due to their thickness, they also provide for a degree of mechanical strength and support for the otherwise sensitive cells. In addition, since busbar 11 is not soldered to the cells along its entire length but rather only along in flat portions 11p, the raised portions 11r provide a measure of stress relief to further minimize stress forces from damaging the submodule.

In addition, when the submodule 25 is to form part of a larger cell module, the raised portions serve as the means to which tabs, such as tabs 12t from a preceding submodule, are connected while the tabs 12t of submodule 25 are connectable to the raised portions 11r of a succeeding submodule. The tabs are bendable over the raised portions so that they form a mechanical as well as an electrical bond therewith. When a permanent bond is desired, the tabs can be soldered to the raised portions. However, since the raised portions are not in contact with the cells' contacts 18, the soldering operation does not affect the cells. Any heat transmitted through bus 11 may be minimized by selecting the bus material to be of a low heat conductivity. Thus once a submodule is constructed and tested, it may be safely soldered to other submodules with a minimum of danger to the cells thereof from the subsequent soldering operation. This is most significant, since each submodule may be separately constructed, tested, and matched to other cell submodules. Then the submodules may be safely soldered together by soldering tabs of one submodule to raised portions of another submodule with all the soldering being done on the busbars at points removed from the cell contacts which are generally the most damage-prone parts of the cells.

Referring to FIGURE 4, there is shown a cell module 30 of three submodules 30a, 30b and 30c, each comprising of six cells 15. As becomes apparent from FIGURE 4, the tabs 12t of submodule 30b are bent or wrapped around the raised portions 11r or submodule 30c while the tabs 12t of submodule 30a are bent around raised portions 11r of 30b. Thus the three submodules are coupled to form module 30. After testing the module, the tabs may be soldered to their respective raised portions to form a soldered joint or bond, the soldering not affecting adjacent cells since soldering is done away from their sensitive contacts. If during testing or thereafter a submodule is found to be faulty, it can be easily replaced by unbending the tabs connecting the submodule to adjacent units and replacing it with a new unit.

From the foregoing, it should be appreciated that by utilizing the modular construction hereinbefore described, each submodule may be separately constructed as an integral unit with all its related components or elements such as cover plates, light filters and the like. Then as an integral tested unit, it may be couplable by means of the busbar tabs and the busbar raised portions to other units to form a larger module or matrix. The use of such an arrangement greatly minimizes the danger that cells may be affected during the submodular interconnections. Thus the problem of producing large cell modules is greatly simplified. In addition, since each submodule is constructed as an integral unit prior to being incorporated in a larger matrix semi-automated soldering techniques may be employed for soldering the busbars 11 and 12 to each set of parallel cells which therafter may be covered with the necessary filters and cover plates.

There has accordingly been shown and described a novel cell modular construction particularly adapted to the formation of multicell modules, in which groups of cells are first interconnected to form complete cell submodules. Once each submodule is completed as a unit, it is couplable to other identical subunits to produce the module with the necessary submodular interconnections not having any damaging affect on the sensitive cells. It is appreciated that those familiar with the art may make modifications in the arrangements as shown without departing from the true spirit of the invention. Therefore, all such modifications and equivalents are deemed to fall within the scope of the invention as claimed in the appended claims.

What is claimed is:

1. In a cell matrix comprising a plurality of submodules each submodule including a plurality of cells with each having first and second electrical terminals, the improvement comprising:

a first busbar having portions thereof electrically connected to the first terminals of each of the cells in a submodule, said first busbar having raised portions between the points in contact with said first terminal; and a second busbar electrically couplable to the second terminals of the cells in each submodule said second busbar including a plurality of tabs extending therefrom whereby said tabs are aligned to be couplable to the raised portions of a first busbar of another submodule to electrically couple the two modules in series and thereby form a cell matrix therefrom.

2. The cell matrix defined in claim 1 wherein said first busbar is characterized by low heat conducting properties to minimize the effect of coupling the tabs of a second busbar of another submodule to the raised portion thereof on the points of contact thereof with the first terminals of said cells.

3. The cell matrix defined in claim 2 wherein the tabs of the second busbar of a first submodule are bendable over the raised portion of the first busbar of another submodule to mechanically be coupled thereto by encircling a portion thereof, whereby said submodules are mechanically coupled to one another.

4. The cell matrix defined in claim 3 wherein each of said cells comprises a plurality of parallel grids and a P type conducting terminal perpendicular to said grid across one end of said cell and an N type conducting material forming the rear surface of said cell, said first busbar being electrically coupled to the P type conducting terminal of each of said cells and the second busbar being coupled to the N type conducting rear surface of said cell.

5. A cell modular construction comprising:

a plurality of cells arranged in groups of parallel cells;

a plurality of undulative busbars each being coupled to the parallel cells in another of said groups, said busbar having raised portions between the points of contact thereof with said cells; and a plurality of undulative busbars each being coupled to the cells in another group opposite the end where said undulative busbar is coupled thereto, said tabs being aligned with respect to said raised portions whereby the tabs of one submodule are couplable to the raised portions of the undulative busbar of another submodule to form a series of submodules.

6. In combination with a plurality of cells each defining a flat surface having a plurality of parallel grids mounted on one side of said surface and a contact coupled to said grids across one end of said surface, the arrangement comprising:

an undulative busbar having points thereof electrically coupled to the contacts across said one end of said cells, said busbar having raised portions between said points of contact; and a second busbar electrically coupled to each of said cells at the other side of the flat surfaces opposite said one ends, said second busbar having a plurality of tabs extending therefrom, said tabs being adapted to be coupled to raised portions of another undulative busbar coupled to another plurality of cells for forming a cell matrix therewith.

7. The arrangement defined in claim 6 wherein at least said first busbar is of an electrically conducting material of low heat conductivity and each of said cells is a P on N type silicon cell having a plurality of grids and said contact on said one side of P type conducting material, the other side of said flat surface being covered with N type conducting material, said first and second bars being electrically coupled to the P and N type conducting materials respectively.

References Cited

UNITED STATES PATENTS

| | | | |
|---|---|---|---|
| 3,053,926 | 9/1962 | Ben-Sira et al. | 136—89 |
| 3,330,700 | 7/1967 | Golub et al. | 136—89 |
| 3,375,141 | 3/1968 | Julius | 136—89 |

WINSTON A. DOUGLAS, Primary Examiner

M. J. ANDREWS, Assistant Examiner